Sept. 20, 1949.    H. J. FOWLER    2,482,615
AUTOMATIC SIGNAL AND REMINDER
Filed July 23, 1945    7 Sheets-Sheet 1

Sept. 20, 1949.  H. J. FOWLER  2,482,615
AUTOMATIC SIGNAL AND REMINDER
Filed July 23, 1945  7 Sheets-Sheet 2
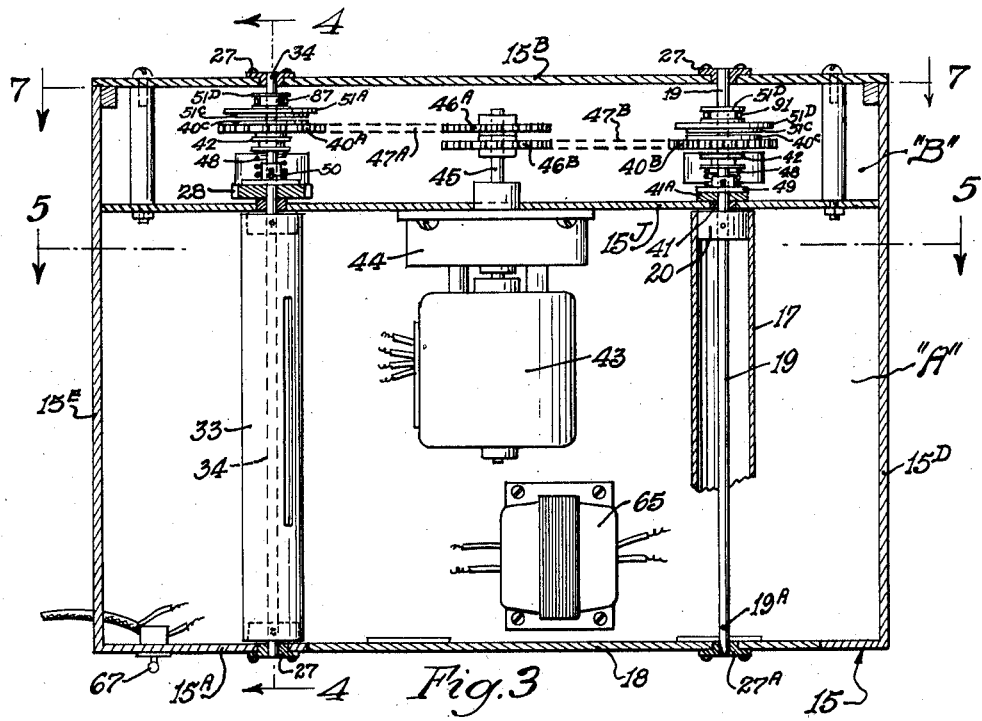
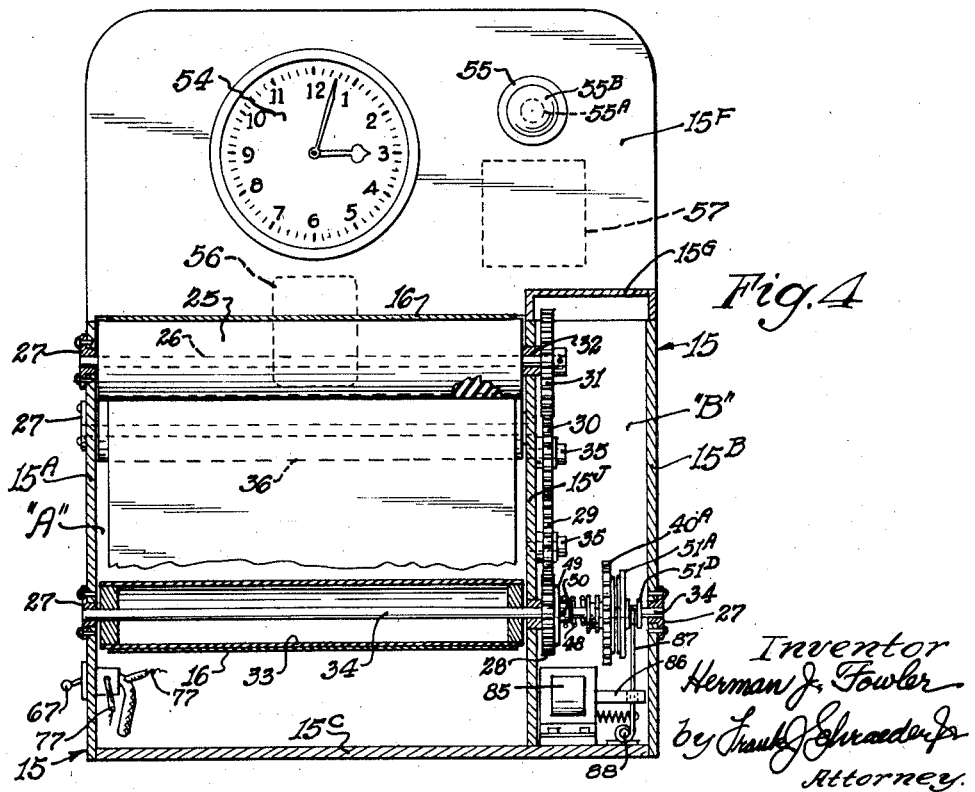
Inventor
Herman J. Fowler
by Frank J. Schraeder Jr.
Attorney.

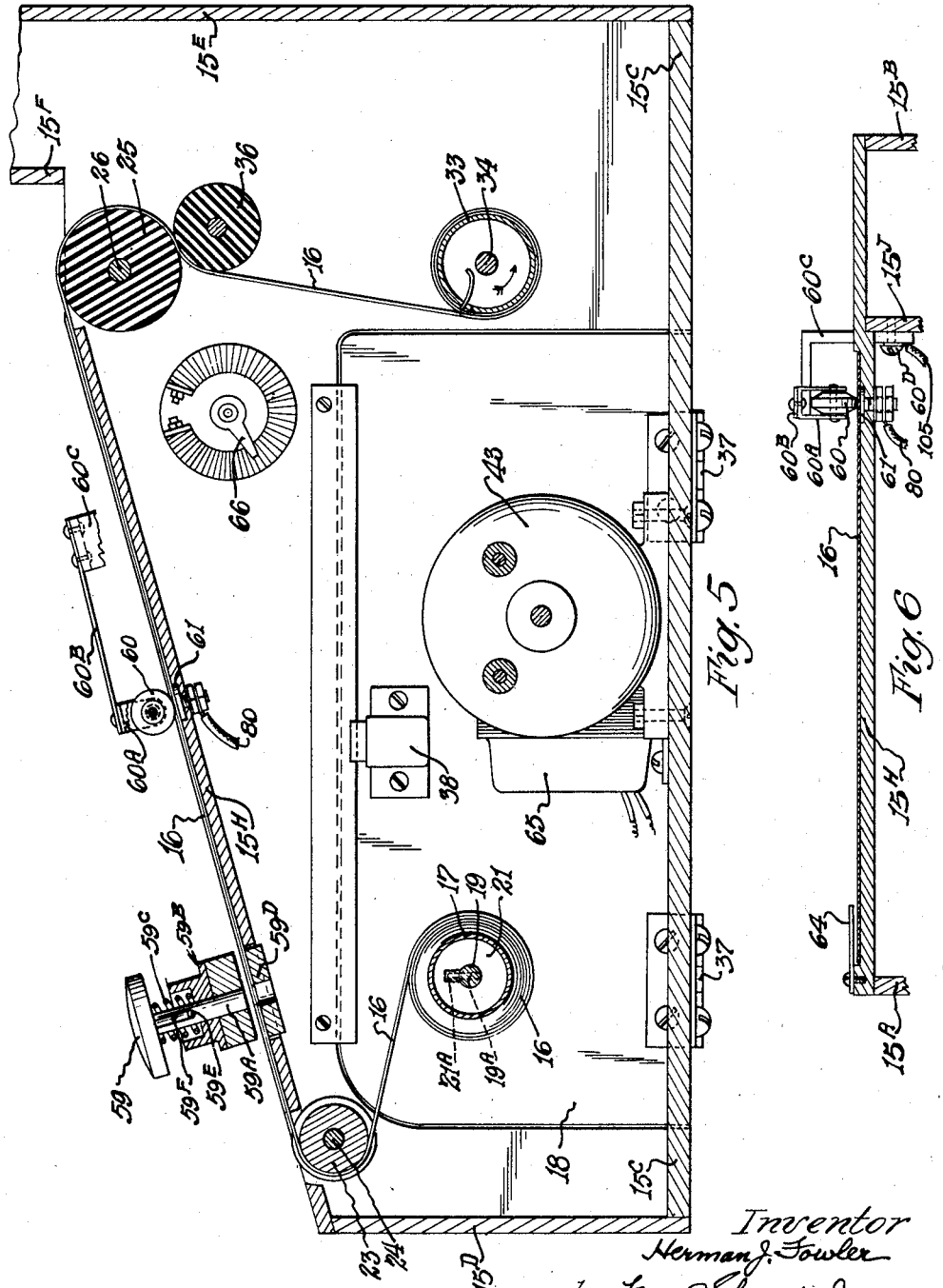

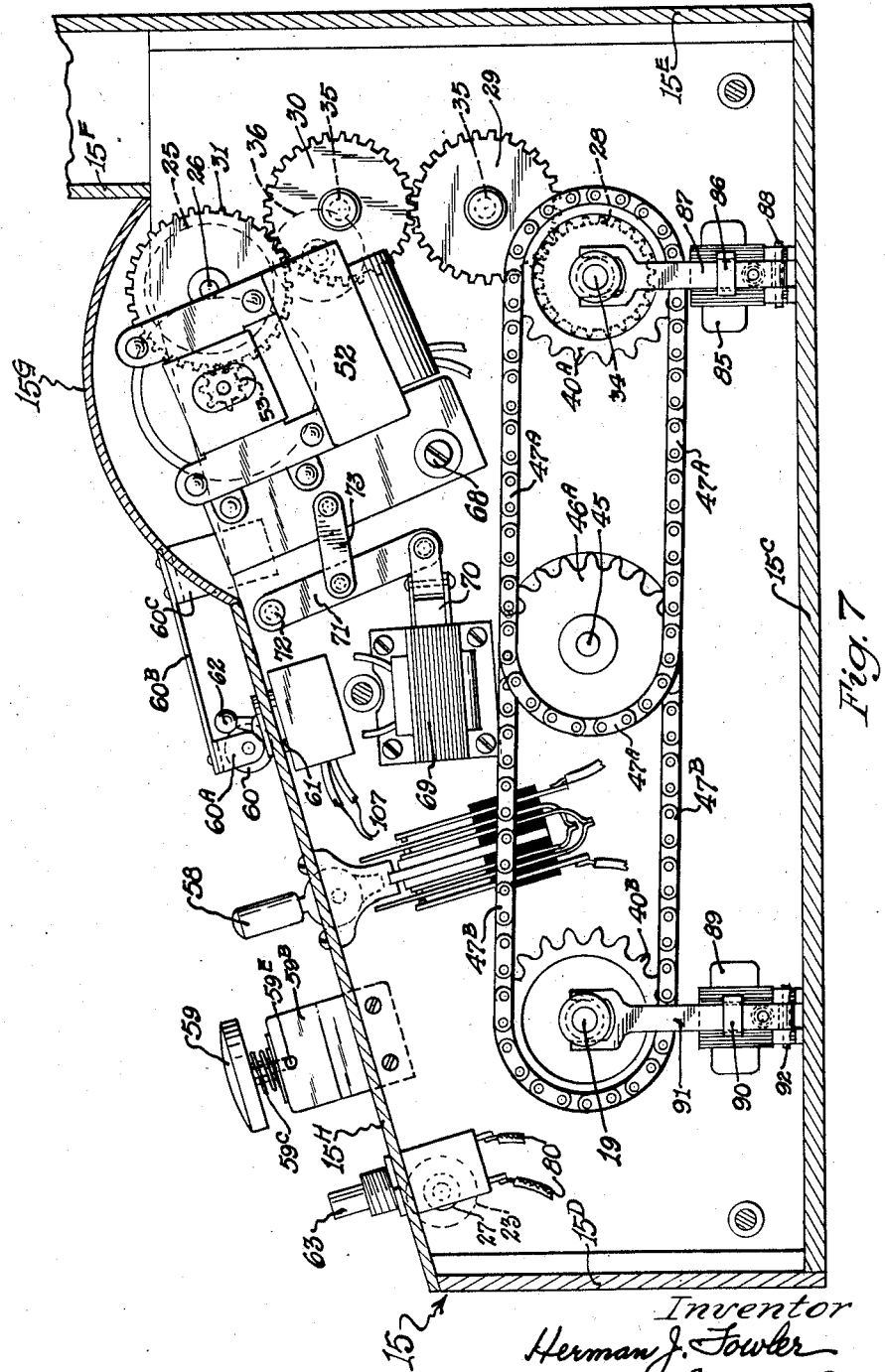

Sept. 20, 1949. H. J. FOWLER 2,482,615
AUTOMATIC SIGNAL AND REMINDER
Filed July 23, 1945 7 Sheets-Sheet 5

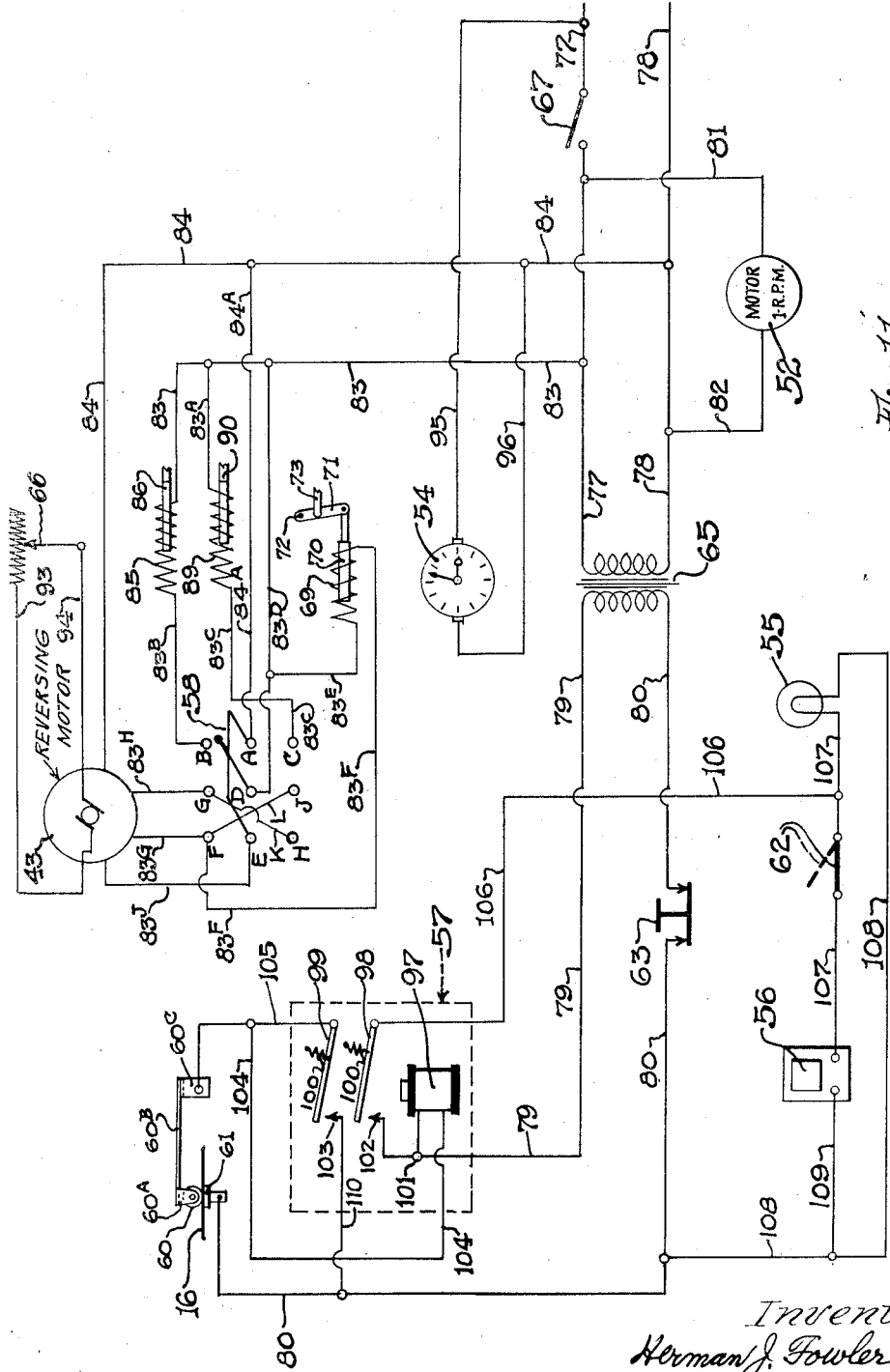

Sept. 20, 1949.     H. J. FOWLER     2,482,615
AUTOMATIC SIGNAL AND REMINDER
Filed July 23, 1945         7 Sheets-Sheet 7
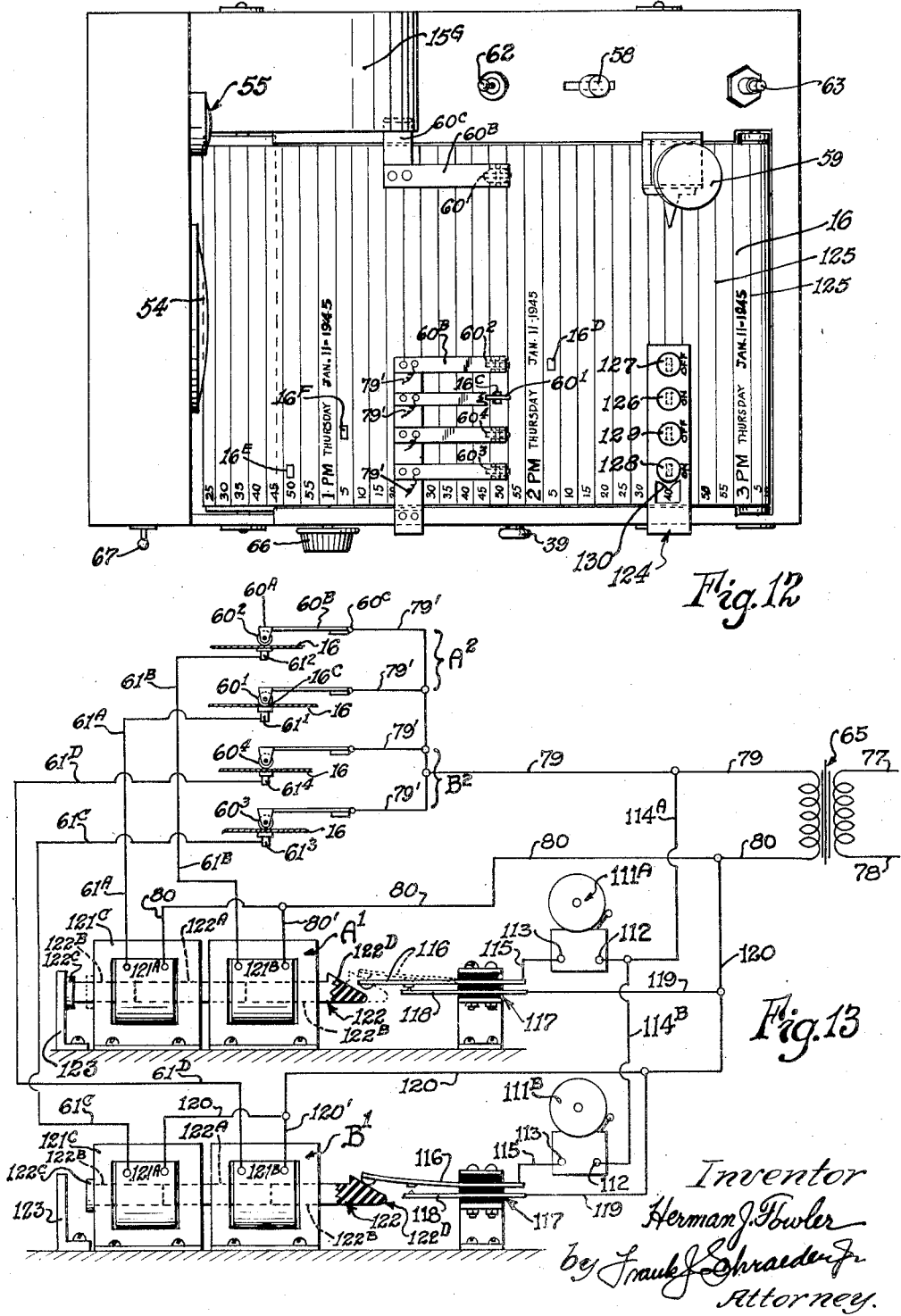

Patented Sept. 20, 1949

2,482,615

UNITED STATES PATENT OFFICE 2,482,615

AUTOMATIC SIGNAL AND REMINDER

Herman J. Fowler, Chicago, Ill.

Application July 23, 1945, Serial No. 606,615

10 Claims. (Cl. 161—2)

This invention relates generally to automatic signals and reminders and has among its objects a system providing audible and visual signals which are automatically operable at predetermined periods of time for predetermined durations; the periods at which the signal or signals become actuated and their duration of operation being selectively predetermined and variable, and the signals being operable at the source of control or at remote points or both locations.

In one exemplification, the invention is shown as applied to automatic warning signal devices of the horological type, designed for use by business men, or others engaged in various commercial or industrial activities, and has as an object the provision of a device for automatically reminding persons, or a group of persons, of predetermined appointments, engagements, things to be done or acts to be performed at predetermined and prerecorded periods of time; the device being automatically operable for automatically producing, at predetermined periods of time and for predetermined intervals, a visual or audible warning signal or simultaneously both signals; such device, if so desired, providing in connection with each such warning signal or signals, means for visibly displaying a pre-recorded written memorandum or intelligence-conveying indicia designating the purpose for or object of each such warning signal.

Another object of my invention is to provide an automatically operable signal device having an elongated movable strip of flexible material such as, for example, paper, and which movable strip functions as a time-controlled instrumentality for controlling the periodic actuation of the warning signals and is adapted to simultaneously receive thereon a permanent record of written memoranda associated with the purposes and objects of the signals given over an extended period of time and clearly showing the minute or hour of time and day of month and year such memoranda were made and signals given.

Still another object of the invention resides in the provision, in a signal system, of one or more electrically operated warning signals including at the source of control a movable elongated strip adapted to receive one or more perforations therein whereby, during the movement of the strip, such perforation or perforations permit one or more electrical circuits to be completed therethrough for actuation of one or more signals, the unperforated portion of said strip in its movement between a pair or pairs of electric contacts being adapted to maintain the circuit or circuits open prior to the closing of the circuit or circuits through the perforation or perforations, and such circuits including means for maintaining same in energized condition to continue the operation of the signals after a perforation has passed a pair of such contacts until the energized circuit is opened by manual operation of one or more switches in the signal circuit or by an associated circuit energized in similar manner by another perforation.

With the above and other objects in view, my invention consists in the novel combination, construction and arrangement of the members and parts shown in illustrative embodiments thereof in the attached drawings, described in the following specification, and particularly pointed out in the appended claims.

In the drawings:

Fig. 3 is a longitudinal section taken on line 3—3 of Fig. 1;

Fig. 4 is a vertical section taken on line 4—4 of Fig. 3;

Fig. 5 is an enlarged vertical section taken on line 5—5 of Fig. 3;

Fig. 6 is an enlarged cross-section taken on line 6—6 of Fig. 2;

Fig. 7 is an enlarged longitudinal section taken on line 7—7 of Fig. 3;

Figure 8:
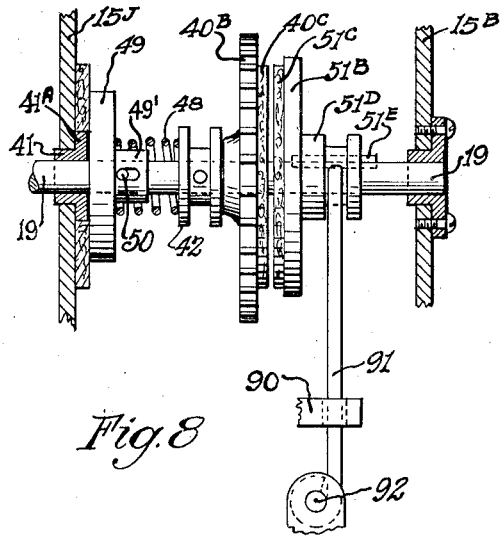
Figure 9:
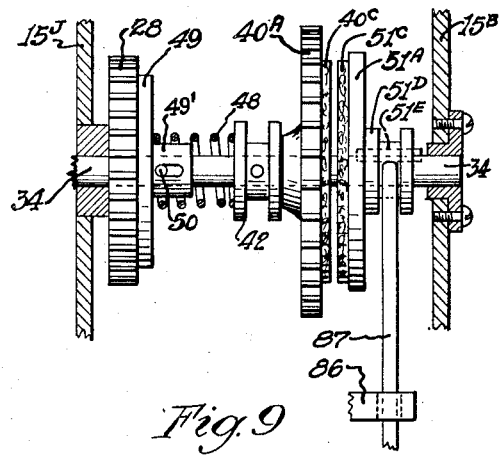
Figure 10:
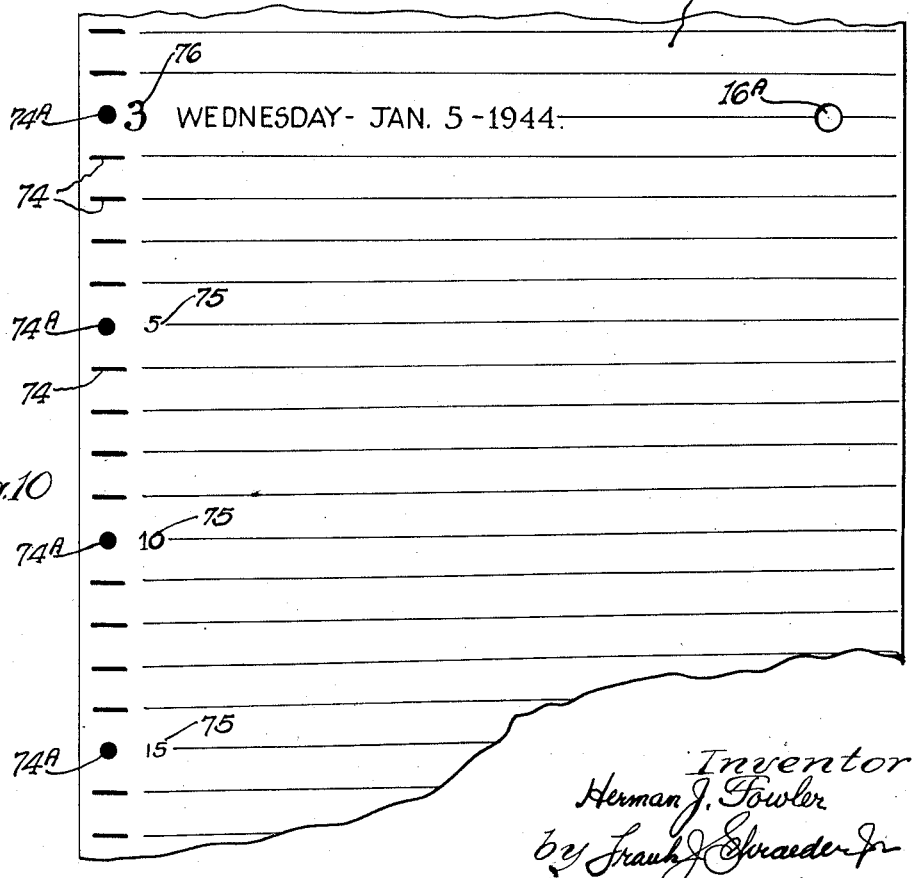

Figs. 8 and 9 are side elevations of the friction clutch drives for the rollers 17 and 33 taken respectively on lines 8—8 and 9—9 of Fig. 7;

Fig. 10 is a plan view of a portion of the paper strip 16;

Fig. 11 is a diagram of the electrical circuit;

Fig. 12 shows a plan view of my device provided with additional remote signal operating means; and Fig. 13 is a diagrammatic illustration showing the electric circuit and electromagnetic devices for operating the remote signal operating means shown in Fig. 12.

In the preferred exemplification of my invention shown in the attached drawings, the device shown includes a casing generally designated by numeral 15 and consisting of side plates 15A and 15B, a bottom plate 15C, a front plate 15D, a rear plate 15E, a front plate 15F for the upper part of the rear portion of the casing, a unitary top and side wall plate 15G for enclosing the upper rear section of the casing, and a top desk plate 15H which is preferably inclined to facilitate writing thereon.

The interior of the main lower lateral section of the casing 15 is divided into two compartments designated by the capital letters A and B and these compartments are separated by the partition plate 15J.

The casing may be made of metal, wood or any other suitable material as, for example, plastic which is a preferable material for the entire casing.

My device makes use of an elongated strip of flexible material such as paper 16 which is initially wound upon a preferably tubular supply roller 17 slidably inserted through the side door 18 upon the free end of a shaft 19 one end portion of which shaft is rotatably supported in a bearing 41 secured in the partition plate 15J, and such end portion of shaft 19 extends through the partition plate 15J into the compartment B.

One end of the tubular roller 17 is slidably insertable upon the enlarged cylindrical support 20 which is secured to and rotatable with the shaft 19 and mounted adjacent to the partition plate 15J. The roller 17 is preferably furnished with a cylindrical support 21 at the opposite end thereof and the support 21 is fixedly mounted within the tubular wall of the roller 17 for positioning upon the shaft 19. The shaft 19 carries a pin 19A which fits into an outer end slot 21A of the support 21 to thereby cause the roller 17 to rotate with the shaft 19. The outer end of shaft 19 is preferably slightly pointed to facilitate its insertion into a bearing 27A which is fixed to the door 18.

The door 18 is hinged at its bottom edge to the bottom plate 15C, as at 37, and is provided with a spring-pressed latch bolt 38 which can readily be forced into released position when the door handle 39 is gripped and forcibly pulled to open the door 18.

The strip of paper 16 is arranged for forward and reverse movements over the top desk plate 15H which is provided with a slightly depressed upper face slightly wider than the width of the paper strip 16 to provide longitudinally disposed guides for the side edges of the strip 16, as more clearly shown in Figs. 5 and 6.

The paper strip 16 passes from the supply roller 17 about a lower idler roller 23 which rigidly is secured to a spindle 24 which is freely rotatable with the roller 23 in any suitable bearings, such as bearings 27, carried on the side wall plate 15A and partition plate 15J.

From the lower idler roller 23, the paper strip 16 passes over the top of the desk plate 15H and thence partially about the power-driven upper roller 25 which is fixed to a driven shaft 26 one end of which is rotatable in a bearing 27 mounted on the side wall plate 15A and the other end thereof extends through the partition plate 15J for rigid connection with the driven gear 31 mounted in compartment B and such shaft end is supported in bearing 32 mounted in the partition plate 15J.

From the upper power-driven roller 25, the paper strip 16 passes onto a receiving roller 33 which is rigidly connected to and rotatable with the driven shaft 34. One end of the driven shaft 34 is rotatable in a bearing 27 mounted on the side wall plate 15A and the other end thereof extends through the partition plate 15J and carries at such end a driven gear 28 which is loosely mounted on shaft 34.

The rollers 25 and 33 are operatively interconnected by means of the intermediate gears 29 and 30, freely rotatable on pins 35 carried on the partition plate 15J, forming a gear train between the gears 28 and 31.

To increase the arc of contact of the paper strip 16 with the driven roller 25 an additional roller 36 may be provided and such roller may be supported in a manner similar to the idler roller 23.

Since the paper supply roller shaft 19 and the paper-receiving roller shaft 34 must rotate with relatively variable speeds due to the gradually increasing diameter of the paper roll on shaft 34 and gradually decreasing diameter of the paper roll on the supply roller shaft 19 and because the driving instrumentalities are of the constant speed type, frictional drives permitting slip are provided for the shafts 19 and 34. Each of the shafts 19 and 34 is provided with a set collar 42 rigidly secured to the shaft and which collar functions as an abutment for one end of a coil spring 48 the other end of which is in abutment with a friction drive plate 49. The friction drive plates 49 are circular and each has a hub 49' mounted on and secured to the roller shaft by a pin 50 which extends through the roller shaft so that the friction plates 49 rotate with the shafts 19 and 34. The friction plate 49 on the shaft 19 is frictionally engageable with the annular flange 41A of the bearing 41 which is rigidly secured in the partition plate 15J. This frictional engagement of the plate 49 with the flange 41A prevents any tendency of the paper on the supply roller to unwind within the compartment A so that the paper is thus retained tightly wound upon the roller 17. The friction plate 49 on shaft 34 functions in like manner to keep the roll of paper on the roller 33 tightly wound thereon by its frictional engagement with the driven gear 28.

To permit slight axial movement of the friction drive plates 49 while under pressure of the coil springs 48, the pins 50 are disposed in slightly axially elongated or slotted holes in the hubs 49' of the plates 49.

On the end portions of the shafts 19 and 34, which extend into compartment B, are respectively sprockets 40B and 40A and these sprockets are loosely mounted on the shafts 19 and 34 adjacent to the collars 42.

The outer faces of the sprockets 40A and 40B are provided with friction disks 40C which are adapted to be operatively engaged respectively by the friction clutches 51A and 51B which are keyed respectively to their shafts 34 and 19 but are alternately axially movable into and out of operative frictional engagement with the friction disks 40C of their respective cooperative sprockets 40A and 40B.

Mounted in compartment A is a reversible electric motor 43 which drives the drive shaft 45 through a speed reduction unit 44. Secured to the outer end of the drive shaft 45, within compartment B, is a pair of sprockets 46A and 46B which, by means of the drive chains 47A and 47B, impart rotation to the sprockets 40A and 40B.

When the device is in operation, the paper strip 16 is in constant movement upwardly over the inclined disk plate 15H and its rate of movement is preferably about one-half inch of length every minute.

The continuous movement of constant speed of the paper strip 16 is attained by means of an electric clock motor 52 such as, for example, a synchronous 110 volt, 60 cycle, 1 R. P. M. electric motor provided with a gear pinion 53 which is normally in mesh with the gear 31 which is secured to shaft 26 to which the paper strip propelling roller 25 is also secured. As above pointed out, the paper strip 16 passes from the drive or propelling roller 25 about the idler roller 36 to the receiving roller 33 which is secured to shaft 34. The rollers 25 and 33 are therefore positively driven by the electric clock motor 52 through motor pinion 53 which drives the gear 31 and, through the intermediate gears 29 and 30, the gear 28.

Since, the roll of paper on roller 33 will gradually increase in diameter as the paper strip 16 is gradually wound upon the receiving roller 33, it is obvious that the rate of rotation of the shaft 34 and roller 33 must gradually decrease in rate relatively to the rate of rotation of the propelling roller 25, hence, as above pointed out, the gear 28 is loosely mounted on the shaft 34 and is provided with a frictional drive connection with shaft 34 consisting of a collar 42 secured to shaft 34 and a coil spring 48 having one end in abutment with the collar 42 and its opposite end in pressure abutment with a friction plate 49 which is keyed to shaft 34 and in constant frictional engagement with the side face of the gear 28. Therefore, while gear 28 is rotated and positively driven with constant speed it will, because of the permitted slip between it and the friction drive plate 49 driven thereby, transmit to the shaft 34 and roller 33 the proper progressively decreasing rate of rotation to keep the paper strip 16 taut between the propelling roller 25 and the receiving roller 33.

As the paper strip 16 gradually leaves the supply roll of same which is mounted on roller 17, the shaft 19 therefor is progressively gradually increasing in speed of rotation. To keep the paper strip taut between the rollers 17 and 23, friction is interposed between the friction drive plate 49, which is keyed to shaft 17, and the flange 41$^A$ of the bearing 41.

It will now be readily apparent that the paper strip 16 is adapted to be moved over the desk plate 15$^H$ with a very slow constant movement through means of the train of gears 28, 29, 30 and 31 and the electric clock motor 52, the motive pinion 53 of which is normally in mesh with the gear 31.

The device includes an electric clock 54 and a visual signal 55 comprising an electric light bulb 55$^A$ mounted in back of a colored glass 55$^B$ such as, for example, a red colored glass. The electric clock 54 and the visual signal 55 are mounted upon the upstanding panel 15$^F$.

Mounted on the rear wall 15$^E$ is an audible signal 56, such as an electric buzzer, and a relay 57.

Mounted upon the desk plate or panel 15$^H$ are a throw switch 58 which controls the energization and reversible rotations of the electric motor 43, a perforator button 59 adapted to perforate the paper strip 16, a roller-type switch 60 which rides upon the paper strip 16 and is adapted to complete the signal-operating circuit by its engagement with a cooperative contact 61 through a perforation in the paper strip 16, a snap switch 62 adapted to disconnect the operation of the audible signal or buzzer 56, a push button switch 63 normally closed but adapted to be depressed to operatively disconnect both audible and visual signals or the visual signal if the audible signal is disconnected, and a time indicator 64 for properly resetting the paper strip 16.

The device also includes a transformer 65 for the electric circuit mounted within the casing beneath the desk plate 15$^H$, a rheostat 66 mounted on wall plate 15$^A$ for varying the speed of the motor 43, and a main circuit switch 67.

The electric clock motor 52, which normally imparts movement to the paper strip 16, is pivotally mounted on a pin 68 fixed in the partition wall 15$^J$ and the pin 68 is offset relatively to the center of gravity of the motor 52 so that its pinion 53 is normally in mesh with the gear 31, however, the clock motor 52 is adapted to be swung about the pivot 68 into position to operatively disengage its pinion 53 from driving of the gear 31 to thereby stop the movement of the paper strip 16 by the clock motor 52 and this is accomplished by the energization of a solenoid 69 which is fixed to the partition wall 15$^J$ and the armature 70 of which is pivotally connected to an arm 71, pivotally suspended from pin 72, which is pivotally connected to the frame of the clock motor 52 by a link 73. The inward movement of the armature 70 will tilt the clock motor 52, to the left as viewed in Fig. 7 about the pivot 68, to thus disengage the motor pinion 53 from the gear 31 to stop the movement of the paper strip 16 by the clock motor 52 and simultaneously cause a comparatively very rapid movement of the paper strip 16, either forwardly or rearwardly by the reversible motor 43 in response to a respectively forward or rearward movement of the throw switch 58 which simultaneously causes the energization of the drive motor 43 and the solenoid 69, all as will later be more fully described in connection with the description of the operation of the device.

As shown more clearly in Figs. 5 and 6, the signal-operating circuit closing roller switch contact 60 is rotatably mounted in an inverted U-shaped yoke 60$^A$ which is resiliently carried at the end of a leaf spring 60$^B$ fixed upon a bracket 60$^C$ which is connected, as by screw 60$^D$ to the partition wall 15$^J$.

The perforator bottom 59 is connected to the top of and reciprocable with a perforator plunger 59$^A$ slidably mounted in a suitable supporting body 59$^B$ carrying a coil spring 59$^C$ which normally retains the perforator plunger 59$^A$ up out of the perforator die 59$^D$. The uppermost position of the plunger 59$^A$ is maintained by a transverse pin 59$^E$ which is secured in the body 59$^B$ and extends through the longitudinal slot 59$^F$ in the plunger 59$^A$.

The body 59$^B$ is carried on a suitable bracket fixedly connected to the partition wall 15$^J$. The perforator is also provided with a pointed indicator 59$^G$.

As shown in Fig. 10, the paper strip 16 has printed thereon certain time-indicating designations consisting of markings along preferably one marginal side portion of the upper face of the strip 16. As an example of such time-indicating designations, the paper strip, as shown in Fig. 10, has printed along one marginal side a series of spaced short lines 74 spaced apart a distance equivalent to the distance moved by the paper strip in one minute of time while propelled by the driving train of gears 28, 29, 30 and 31 driven by the clock motor 52.

For convenience, each fifth minute space circular mark 74$^A$ is accompanied by a numeral, designated by reference numeral 75, which indicates the distance in time through which the paper strip 16 has moved past a given point, such as the pointed indicator 64. Each twelfth group of five minute designations is indicated by a circular mark accompanied by a number, designated by reference numeral 76, indicating the hour of the day and in parallel alignment therewith is printed the day of the week, the calendar month, the date of the day of the month, and the year.

While I have preferred to show, for illustrative purposes, spaced markings 74 spaced apart one minute of time, it is obvious that such marginal time designations 74 could be other than minute designations, as for example, such time designating markings could be such which would indicate 5, 10, 15 or other minute intervals, even one-half or one hour interval designations. Also, the length of a one minute space will depend upon the design of the gear drive between the motor pinion 53 and the driven roller 33.

In an exemplification of one use of my device, as for example, the use of the device for receiving a written record of a business or other appointment to be kept at a certain predetermined future day, or specific hour or minute of such future day and for causing an alarm signal to be given to the user of the device automatically on such future day, hour or minute, the operation of the device may be described as follows:

The closing of the main switch 67 will immediately place the device into operative condition under which the following elements will simultaneously be in continuous operation prior to the operative use of the device by the user:

(a) The electric clock 54 will be energized and operative to continuously visibly show the time of day; and (b) The electric clock motor 52 will be energized to cause a comparatively slow movement of the paper strip 16 forwardly upwardly over the desk plate 15H; such movement being imparted to the paper strip 16 from the electric clock motor pinion 53 through the train of gears 31, 30, 29 and 23 and through the friction drive elements 49, 49' and 50, to the shaft 34 and its strip-receiving roller 33 to thereby cause the paper strip to move from the supply roller 17, over the positively driven roller 25, around the idler roller 36 and onto the receiving roller 33.

This normal or what may be termed the inactive operation of the device is continuous as long as the main switch 67 is closed and, obviously, as long as the supply roller 17 has a supply of paper thereon and the device is ready for use during such inactive operation.

During such normal inactive operation, the time of day may be quickly ascertained from the electric clock 54 and such time of day will be correspondingly visibly indicated on the strip 16 at the pointed end of the time indicator 64. The time of day shown on the electric clock 54 in Fig. 4 is 3 minutes after 3 o'clock and this same time is shown in Fig. 2 on the paper strip 16 at the pointed end of the indicator 64.

Assuming now that the user desires to preset the device so that it will, at some predetermined future day, hour and minute automatically cause both visual and audible warning signals to be placed into operation to warn him of an appointment which he has at some future time, and assuming, for example, that the user desires to be pre-warned at 5 minutes prior to an office conference appointment to be had on the 8th day of January at 10 minutes after 3 o'clock in the afternoon of that day.

Figure 2:
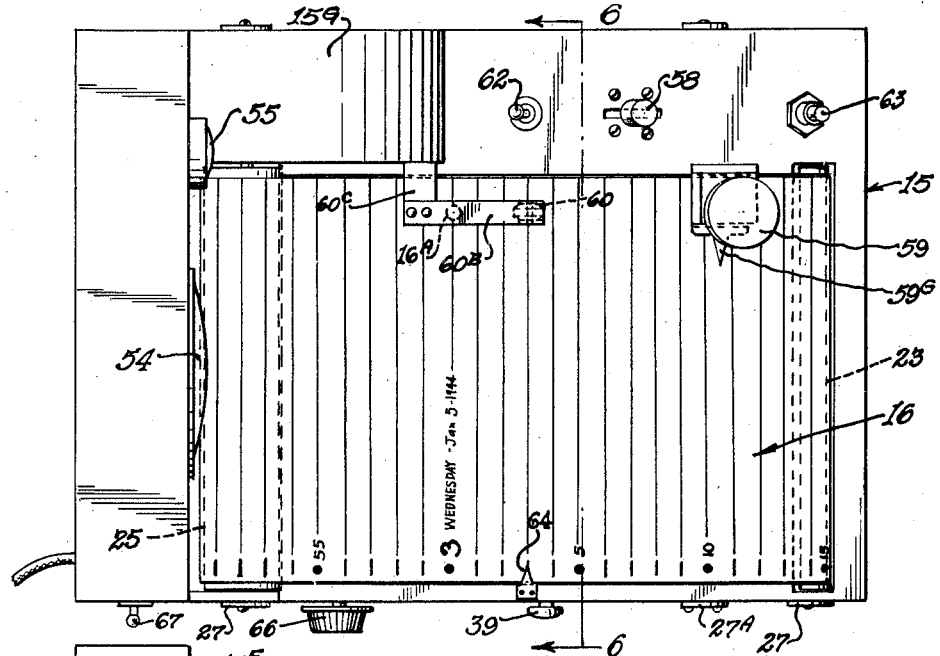
Fig. 2 is a plan view of the device.
Figure 1:
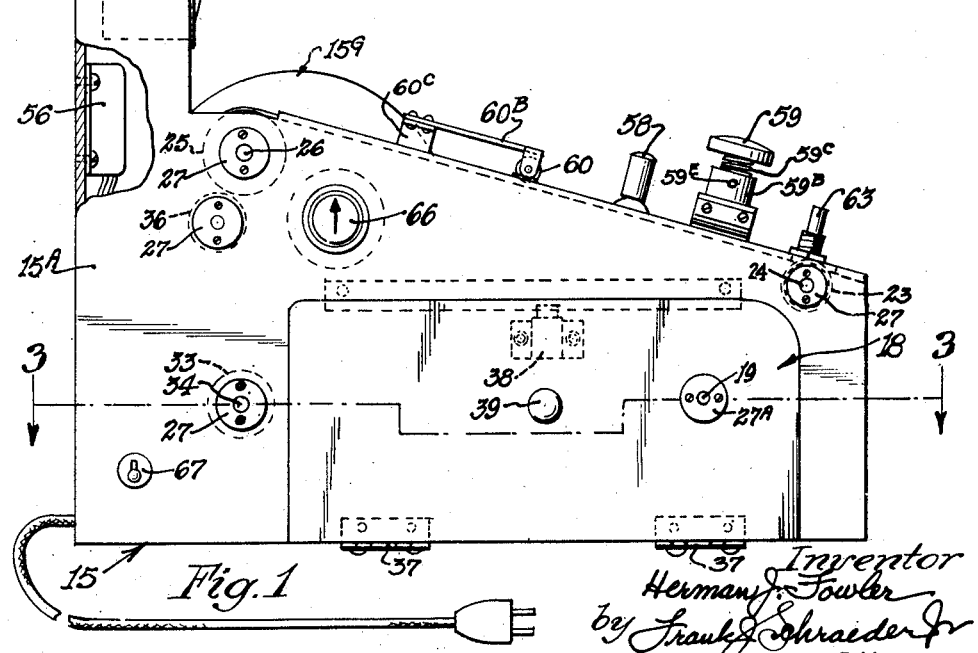
Fig. 1 is a side elevation of a device embodying one form of my invention.

The time of day indicated on the device by the electric clock in Fig. 4 and on the paper strip 16 at the point of the time indicator 64 in Fig. 2 is shown as being 3 minutes after 3 o'clock of January 5th.

The first step in pre-setting the device for future signal operation consists in moving the operating arm of the motor switch 58 forwardly toward the panel 15F which simultaneously energizes the solenoid 69 and the motor 43 thereby disengaging the pinion 53 of the clock motor 52 from gear 31 to thus stop the propulsion of the paper strip 16 by the motor 52 and its train of gears 31 to 23 inclusive. At the same time, through the energization of motor 43, the paper strip 16 will be caused to be comparatively quickly advanced in a forward movement over the desk 15H. When the indicator 59G of the perforator button 59 is aligned with the time indication on the paper strip 16 indicating 5 minutes after 3 o'clock of January 8, the arm of switch 58 is promptly released and the perforator button 59 is promptly depressed to pass the plunger 59A thereof through a marginal portion paper strip 16 into the die 59D thus perforating the strip 16 in alignment with the time-indicating indicia on the strip designating the time as 5 minutes after 3 o'clock of the 8th day of January.

When the arm of switch 58 is released to permit perforation of the strip 16 it automatically moves to open switch position whereupon the solenoid 69 is deenergized to permit the clock motor 52 to tilt by gravity into operative position with its pinion 53 in mesh with gear 31 to thus very slowly drive the strip forwardly, hence in practice, the user may release the arm of switch 58 slightly prior to 5 minutes after 3 o'clock, for example, 4½ minutes after 3 o'clock if very accurate operation is desired and this will allow one-half of a minute movement of paper strip by clock motor 52 before perforating the strip 16.

Since the movement of the strip 16 by the clock motor 52 is very slow, the strip 16 may readily be quickly perforated while in such very slow motion.

Also, promptly upon perforating the strip 16, the user may desire to make a written record on the strip 16 of such future appointment, hence, the user may readily write a memorandum of such appointment, in pencil or ink, upon the space on the strip 16 opposite to or in line with the perforation made just prior thereto.

Having made such memorandum, the next step is to reset the strip 16 into proper timed position which is accomplished by moving the operating arm of the double throw motor switch 53 rearwardly away from panel 15F which again simultaneously energizes the solenoid 69 and the motor 43 thereby disengaging the pinion 53 of the clock motor 52 from gear 31 to disconnect the driving movement of the paper strip 16 by the clock motor 52 but to simultaneously cause the paper strip 16 to move comparatively rapidly rearwardly over the desk 15H so as to be rewound back upon the paper supply roller 17, the operating arm of the double throw switch 58 being retained in such rear position during the reverse movement of the strip 16 until the time-indicating pointer 64 is in register with the then actual time of day indicated opposite pointer 64 by the marginal time-designating indicia on the strip 16 and which actual time of day will be quickly ascertained from the electric clock 54 on the panel 15F whereupon the manual release of the operating arm of the switch 58 the normal forward movement of the strip 16 will thus be reestablished through the deenergization of solenoid 69 and motor 43.

I have stated above that when the operating arm of the double throw switch 58 is moved forward, toward the panel 15F, the paper strip 16 is moved rapidly forwardly and that when such switch arm is moved rearwardly, away from panel 15F, the movement of the paper strip 16 is reversed so that it is moved rearwardly for rewinding onto the supply roller 17. In both instances, such rapid forward and reverse movements of the strip 16 are accomplished, as above stated, through the operation of the motor 43 and these two operations may be more readily understood by reference to the electrical system shown in the wiring diagram in Fig. 11 wherein the source of electric energy, such as a 110 volt electric current, is received through the two main conductors 77 and 78, controlled by the main switch 67, and these two main conductors 77 and 78 are connected to a transformer 65 to step the current down to lower voltage, such as 6 volts, for transmission thereof from the transformer 65 through a pair of sub-conductors 79 and 80 which are the source of electric energy for the warning signal operating circuit.

The synchronous clock motor 52, which normally moves the strip 16 forwardly, is connected to the two main conductors 77 and 78 by the conductors 81 and 82 and is in constant operation while the main switch 67 is closed.

The conductors 83 and 84, constituting the source of electric energy for propelling the strip 16, are connected to the main conductors 77 and 78 and supply current to the double throw switch 58, the reversible motor 43, the solenoid 69 which operatively disengages the strip-propelling motor 52, and to the alternately operable solenoids 85 and 89. All of these elements are within the strip-propelling circuit.

The electric panel clock 54 is connected to the conductors 77 and 84 by conductors 95 and 96.

The conductor 84 is connected to the reversible motor 43 which is provided with a speed-regulating rheostat 66 connected to the motor 43 by conductors 93 and 94, thereby providing an adjustable control for varying the speed of the strip 16 in its forward and reverse movements when the strip 16 is being positioned for perforating.

The double throw switch 58 is provided with binding posts A, B, C, D, E, F, G, H and J, a cross conductor K connecting posts G and H, and a cross conductor L connecting posts F and J.

The reversible motor field winding is connected to the double throw switch posts E, F and G by respectively conductors 83J, 83G, and 83H. The central post A is connected to conductor 84 by conductor 84A. The post B is connected to one terminal of the coil of the solenoid 85 by conductor 83B and the other end of the coil of solenoid 85 is connected to the conductor 83. The post C is connected to one end of the coil of solenoid 89 by conductor 83C while the other end of the coil of solenoid 89 is connected to conductor 83 by the conductor 83A.

One terminal of the coil of the solenoid 69 is connected to the conductor 83D by conductor 83E and the other terminal is connected to the post F by conductor 83F.

The warning signal operating circuit includes the relay 57, the normally open circuit-closing roller contact 60, the visual red light warning signal 55, the audible warning signal or buzzer 56, the normally closed audible signal switch 62 for silencing the buzzer 56, and the normally closed signal control switch 63, within the main conductor 80, which is adapted to be opened to operatively disconnect both visual and audible signals, if switch 62 is closed, or to disconnect the operation of the visual signal 55 if switch 62 is open.

The warning signal operating circuit includes the main conductors 79 and 80 through which the current of lowered voltage flows from the transformer 65.

The relay 57 includes an electromagnet 97 and a pair of armatures 98 and 99 normally held in open position by springs 100.

The main conductor 79 extends from the transformer 65 to the post 101 which is electrically connected to one terminal of the electromagnet 97 and also to the armature contact 102. The other terminal of the electromagnet 97 is connected by conductor 104 with the conductor 105 which connects the roller contact support 60C with the armature 99.

The armature 98 is connected by conductor 106 to conductor 107 the opposite ends of which extend, one, to one of the terminals of the visual or electric light signal 55, and the other, to one of the terminals of the audible signal or buzzer 56 through the audible signal control switch 62. The other terminal of the visual signal 55 is connected by the conductor 108 to the main conductor 80, while the other terminal of the audible signal 56 is connected by conductor 109 to the conductor 108. The main conductor 80 is also connected to the armature contact 103 by the conductor 110.

One side of the main signal-disengaging switch 63 is connected by the conductor 80 with the stationary contact 61 which cooperates with the roller contact 60.

The normal or signal-inactive-operation of the device is readily apparent from the above description and attached drawings. It will be understood that, under such signal-inactive-operation, the strip 16 is continuously moved forwardly or upwardly over the desk plate 15H by the clock motor 52 at such rate that the movement of the strip 16 is time-synchronized with the clock 54, that is, the indicator 64 and time-designating indicia printed along the marginal edge of the strip 16 will indicate the time of day.

The electrical system is such that when the operating arm of the double throw switch 58 is moved forwardly, the motor 43, the soledoid 69, and the solenoid 85 are simultaneously energized, and, through such simultaneous energization the clock motor 52 is operatively disconnected by solenoid 69 from its strip-propelling operation while the motor 43 is simultaneously caused to impart rotation to shaft 45, sprockets 46A and 46B, the drive chains 47A and 47B, and sprockets 40A and 40B.

Since only solenoid 85 (not solenoid 89) is energized, its armature 86 will be caused to actuate its associated clutch-shifting arm 87 inwardly to move the clutch elements 51A, 51C and 51D into frictional operation with the clutch elements 40A and 40C to thus impart rotation from sprocket 40A through key 51E to shaft 34 thereby rotating the strip-receiving roller 33 at increased speed until the time of day and month of a desired future signal operation is shown on the marginal designations thereof in alignment with the indicator 59G of the strip perforator 59 whereupon the release of the double throw switch 58, the perforator 59 may be depressed to perforate the strip with a perforation, as for example, designated by numeral 16A in Fig. 10.

Having thus set the device for future signal operation, the strip 16, which has been moved into advanced position, must then be rewound upon the supply roller 17 by imparting reverse rotation to shaft 19 and this is accomplished by the next step of operation which is as follows:

When the operating arm of the double throw switch 58 is moved rearwardly, the motor 43, the clock motor operating solenoid 69, and the solenoid 88 are simultaneously energized to thus cause the clock motor 52 to be operatively disconnected by solenoid 69 from its strip-propelling operation while simultaneously the motor 43 is again caused to impart rotation to shaft 45, sprockets 46^A and 46^B, drive chains 47^A and 47^B, and sprockets 40^A and 40^B.

Since in this reverse operation of motor 43 only solenoid 89 (not solenoid 85) is energized, its armature 90 will be caused to shift its associated clutch-shifting arm 91 inwardly to move the clutch elements 51^B, 51^C and 51^D into frictional operation with the clutch elements 40^B and 40^C to thus impart rotation from sprocket 40^B through key 51^E to shaft 19 thereby rotating the strip supply roller 17 and rewinding the strip 16 thereon until the actual time of day and month shown on the marginal designations thereof is in alignment with the indicator 64 whereupon the double throw switch 58 is released to again reset the device from normal signal-inactive-operation and during which operation the strip 16 will continue to be moved forwardly by the clock motor 52.

Assuming now, as in the example heretofore stated, the strip 16 had been perforated with a perforation 16^A in alignment with the marginal time-designating indicia designating 5 minutes after 3 o'clock of the 8th day of January, the perforated portion of the strip will gradually move forwardly while the strip 16 is being wound onto the strip-receiving roller 33 and, when the perforation 16^A passes under the roller contact 60, the roller contact 60 will engage contact 61 and thus close the warning signal operating circuit.

When the circuit portion between contacts 60 and 61 is closed, the relay 57 is energized to close the circuit between the armature 98 and contact 102 and between the armature 99 and contact 103 to thus simultaneously energize the audible buzzer signal 56 and the visual light signal 55.

Such simultaneous audible and visual signal operation will continue indefinitely even though the perforated portion of the strip has passed beyond the two contacts 60 and 61 although the flow of current between these contacts 60 and 61 is interrupted or, in other words, the circuit through the contacts 60 and 61 is opened by the unperforated strip portion interposed between them. This is so because once the circuit between contacts 60 and 61 is closed, the electromagnet 97 of relay 57 is energized and after such initial energization the flow of the current from conductor 80 is established through conductor 110, contact 103, armature 99, conductor 105, conductor 104, and through the winding of the electromagnet coil to post 101 which is permanently connected with the other main conductor 79. During such relay energization both audible and visual signals are maintained in continuous operation by the closed circuit between the main conductor 79, contact 102, armature 98, and conductors 106, 107, 108, and 109; the conductor 108 being connected with the other main conductor 80.

Such continuous operation of both of the signals 55 and 56 will continue until the switch 62 is moved into open position whereupon the buzzer or audible signal 56 will be silenced, however, the visual signal 55 will continue in operation. If the push button switch 63 is depressed to open the circuit thereat the visual signal 55 will then cease to operate. If the switch 62 is closed both of the signals 55 and 56 will become simultaneously inoperative upon opening the circuit through the push button switch 63.

In either event, the opening of the circuit through the push button switch 63 not only renders both signals 55 and 56 inoperative but simultaneously opens the relay circuit and thereby deenergizes the electromagnet 97 which reestablishes the entire circuit for another cycle of operation since a deenergization of the electromagnet 97 causes an automatic movement of the relay armatures 98 and 99 into open circuit position until again closed by the closing of the circuit through the contacts 60 and 61.

The above-described signal device and system may readily be provided with additional automatically operable remote signal operating means such as illustrated in Figs. 12 and 13, however, such remote signal operating means need not necessarily be incorporated with the device and system shown in Figs. 1 to 11 inclusive but may be built and used separately as means for automatically controlling one remote signal or a plurality of remote signals at predetermined periods of time and for predetermined durations of time.

As illustrated in Figs. 12 and 13, the automatic remote signal system is shown applied to the operation of two remote signals in the form of electric bells 111^A and 111^B. The post 112 of bell 111^A is connected by the conductor 114^A with the conductor 79 of the transformer 65 and the post 112 of the bell 111^B is also connected to the conductor 79 by the conductor 114^B which is connected with the conductor 114^A. The posts 113 of the bell signals are each connected by a conductor 115 with a resilient movable contact arm 116 of a switch 117 and the other contact arm 118 of each switch 117 is connected by conductors 119 and 120 with the conductor 80 of the transformer 65.

Each switch 117 is operable by an electromagnetic operator having a pair of solenoid coils 121^A and 121^B provided with a common armature 122 and the coils 121^A and 121^B are adapted to be alternately energized to thereby alternately move the armature 122 in opposite directions.

Each armature 122 consists of a central electrically-responsive iron core portion 172^A and end portions 122^B of electrically non-conductive material such as, for example, Bakelite or other plastic composition.

Each armature 122 is provided with an enlarged abutment head 122^C at the rear end thereof which fixes the outermost and innermost positions of the armature 122 by, respectively, the engagement of the head 122^C with the laminated field piece 121^C and a rear stop angle 123. Each armature 122 is also provided with an operating head 122^D at the front end thereof which, when the armature is in its outermost position, is adapted to engage and lift the contact arm 116 to thus break the circuit between the switch arms 116 and 118 which is the normal or inoperative position of the switches 117.

One end of each of the coils 121^A and 121^B, which are operatively associated with the audible signal 111^A, is connected directly to the conductor 80, such connection including the branch conductor 80' leading to the corresponding one end of the coil 121^B, and the corresponding ends of the coils 121$^A$ and 121$^B$, which are operatively associated with the audible signal 111$^B$, are also connected with the conductor 80 through the conductors 120 and 120', thus the two audible signals 111$^A$ and 111$^B$ are independently controlled by their individual switches 117 through the circuits described which are energized by the current flowing through the conductors 79 and 80, and, each switch 117 is individually actuated from normal open position to closed position and vice versa by its individual armature 122 and its operatively associated electromagnetic coil assembly. The electromagnetic operator for actuating switch 117 for the audible signal 111$^A$ is generally designated by A$^1$ and the electromagnetic operator for the signal 111$^B$ is designated by B$^1$.

The electromagnetic operators A$^1$ and B$^1$ for respectively signals 111$^A$ and 111$^B$ are initially controlled by the circuit portions which are respectively generally designated in Figs. 12 and 13 by A$^2$ and B$^2$. These circuit portions A$^2$ and B$^2$ function to complete the circuits for the operators A$^1$ and B$^1$ through their connections with respectively coils 121$^A$ and 121$^B$ and the conductor 79; the connections of the coils 121$^A$ and 121$^B$ with the conductor 80 having been hereinabove described.

As shown in Fig. 13, the circuit portion A$^2$ consists of a pair of circuit-closing roller switch contacts 60$^1$ and 60$^2$ carried in the inverted V-shaped yokes 60$^A$ at the free ends of the leaf springs 60$^B$ which are supported on brackets 60$^C$ electrically connected with the conductor 79 by branch conductors 79'. Cooperating with the roller contacts 60$^1$ and 60$^2$ are respectively stationary contacts 61$^1$ and 61$^2$. The contact 61$^1$ is connected by conductor 61$^A$ to coil 121$^A$ and the contact 62$^2$ is connected by conductor 61$^B$ to coil 121$^B$ of the electromagnetic operator A$^1$.

The circuit portion B$^2$ consists of a pair of circuit-closing roller switch contacts 60$^3$ and 60$^4$ also electrically connected with the conductor 79 by branch conductors 79'. Cooperating with the roller contacts 60$^3$ and 60$^4$ are respectively stationary contacts 61$^3$ and 61$^4$. The contacts 61$^3$ and 61$^4$ are respectively connected by conductors 61$^C$ and 61$^D$ to respectively coils 121$^A$ and 121$^B$ of the electromagnetic operator B$^1$.

The energization of the coils 121$^A$ moves the armatures 122 inwardly to thus close the circuits through the switches 117 to energize the signals 111$^A$ and 111$^B$. When the coils 121$^B$ are energized the armatures 122 are moved outwardly to thus separate the contact arms 116 and 118 to open the circuits through the switches 117.

The control circuits through the roller contacts 60$^1$, 60$^2$, 60$^3$ and 60$^4$ and their respective cooperating contacts 61$^1$, 61$^2$, 61$^3$ and 61$^4$ are normally closed by the clock-actuated strip 16.

Reference to the circuit diagram in Fig. 13 will disclose that when the circuit is closed through the pair of contacts 60$^1$ and 61$^1$, the coil 121$^A$ of the operator A$^1$ is energized to thereby move the armature 122 inwardly to thus close the circuit through switch 117 and cause an actuation of the audible signal 111$^A$. In the described instance, the closing of the circuit through the contacts 60$^1$ and 61$^1$ is accomplished by passing a perforated portion of strip 16 between these contacts to permit the roller contact 60$^1$ to engage the contact 61$^1$. In Figs. 12 and 13, the roller contact 60$^1$ is shown moved through the perforation 16$^C$ into contact engagement with the contact 61$^1$.

The energization of coil 121$^A$ of the operator A$^1$ having moved the armature 122 thereof inwardly, as shown in Fig. 13, the audible signal 111$^A$ will remain in energized operation through its closed switch 117 until the contacts 116 and 118 thereof are separated by the energization of coil 121$^B$ of operator A$^1$ and the outward movement of its armature 122 through the closing of the circuit through contacts 60$^2$ and 61$^2$ which occurs when the perforation 16$^D$ is positioned between these two contacts. As illustrated in Fig. 12, the audible signal 111$^A$ will be in continuous operation for a period of fifteen minutes or from 1:50 p. m. to 2:05 p. m.; the audible signal operation being initiated by the passage of the perforation 16 under the roller contact 60$^1$ and discontinued when the perforation 16$^D$ passes between contacts 60$^2$ and 61$^2$.

Referring to Fig. 12, it will be observed that prior to the above-described operation of the audible signal 111$^A$, the audible signal 111$^B$ had been in operation for a period of fifteen minutes from 12:50 p. m. to 1:05 p. m. as evidenced by the perforations 16$^E$ and 16$^F$; such prior signal operation was initiated when perforation 16$^E$ passed between contacts 60$^3$ and 61$^3$ whereby coil 121$^A$ of the electromagnetic operator B$^1$ was energized to move its armature 122 inwardly against the stop angle 123 to thus cause a circuit-closing engagement of contacts 116 and 118 through the switch 117 for the audible signal 111$^B$. When, however, the perforation 16$^F$ passed under roller contact 60$^4$ to permit this roller to engage contact 61$^4$ to thereby close the circuit through these contacts, the coil 121$^B$ of the operator B$^1$ was energized to cause an outward movement of its armature 122 to thereby separate the contacts 116 and 118 of the switch 117 for the signal 111$^B$.

In the signal system just described, the device as illustrated in Fig. 12 obviously includes a multiple perforator 124 for time-perforating the clock actuated strip 16, as for example, with the hereinabove described cooperating pair of perforations 16$^C$ and 16$^D$, and the cooperating pair of perforations 16$^E$ and 16$^F$.

It will be noted that the two perforations of each of the cooperative pairs of perforations are spaced from each other transversely and longitudinally of the strip 16.

As illustrated in Fig. 12, the moving strip 16 is provided with time-designating spaces of five minute intervals defined by the horizontal lines 125 and the hours and minutes being printed along a longitudinal marginal edge of the strip 16.

The perforator 124 consists of an elongated plate superposed over the strip 16 and, in the present illustration, carrying four perforators 126, 127, 128 and 129. The "On" perforators 126 and 128 being aligned with the signal starting roller contacts 60$^1$ and 60$^3$ and the "Off" perforators 127 and 129 being aligned with the signal stopping roller contacts 60$^2$ and 60$^4$, and the perforator plate being provided with an opening formed with a pointer or indicator 130 which, as clearly seen in Fig. 12, registers with the marginally printed hours and minutes so that the "On" and "Off" signal actuating perforations may be selectively perforated by the perforators to afford the selective operation of either or both of the audible signals 111$^A$ and 111$^B$ at the desired time and for a predetermined selective duration of time.

The construction and operation of the perforators 126, 127, 128 and 129 is similar to that of the hereinabove described perforation 59, While I have herein illustrated and described certain exemplifications of my invention which embody the principles of the invention in preferred illustrative embodiments, it is to be understood that my invention is not to be construed as being limited to the constructions and arrangements shown and described as various modifications of such constructions and arrangements may occur to those skilled in the art to which my invention appertains without departing from the spirit and scope of my invention defined in the appended claims.

I claim:

1. In a signal system, an electric circuit including a normally deenergized visual signal, a normally deenergized audible signal, a normally open switch adapted for simultaneously energizing said signals and having a pair of contacts, a movable strip of electrically non-conductive material passing between said contacts thereby maintaining said switch in open position and both of said signals deenergized and having at least one perforation therein, means for moving said strip, both of said signals being simultaneously energized when a perforated portion of said strip is brought into alignment with said contacts and said contacts engage one with the other to close the circuit through said switch, a relay in said circuit for maintaining both of said signals energized after initial energization through the closing of said circuit through said switch contacts, a normally closed second switch in said circuit adapted to be opened to deenergize said audible signal, and a third normally closed switch in said circuit adapted to be opened to simultaneously deenergize said relay and both of said signals or if said audible signal is deenergized then to simultaneously deenergize said relay and said visual signal.

2. In a signal system, an electric circuit, a signal in said circuit, an electromagnetically operable switch in said circuit, a pair of control switches in said circuit each having a pair of opposed contacts, an elongated strip of electrically non-conductive material having at least two transversely and longitudinally spaced apart perforations, and means for moving said strip between said opposed contacts to thereby maintain said control switches in open position and said signal inoperative, said signal being operative when one of said perforations in said strip is moved into alignment with a pair of contacts of one of said control switches to thereby permit said contacts to engage each other to close the circuit therethrough and through said electromagnetically operable switch, said signal being rendered inoperative when the other one of said perforations in said strip is moved into alignment with a pair of contacts of the other one of said control switches to close the circuit therethrough and thereby open the circuit through said electromagnetically operable switch.

3. In a signal system, an electric circuit, a normally deenergized electrically operable signal in said circuit, an electromagnetically operable switch in said circuit, a normally open control switch in said circuit having a pair of contacts adapted to successively close said circuit through said control switch and through said electromagnetically operable switch to successively energize and deenergize said signal, a movable strip of electrically non-conductive material passing over said contacts to normally maintain said contacts in open position and having at least two transversely and longitudinally spaced perforations therein whereby, during the movement of said strip, the circuit is successively closed first through one of said perforations and one of said contacts to thereby close the circuit through said electromagnetically operable switch and then through the other one of said perforations and the other one of said contacts to thereby open the circuit through said electromagnetically operable switch.

4. In a signal system as set forth in claim 1, said electric circuit including a synchronous electric clock motor for imparting movement to said strip, an electrically operable clock for indicating the time of day, a stationary indicator positioned at one side of said strip, said strip having thereon time-designating indicia arranged longitudinally of said strip adapted to register with said indicator to designate the time of day, said synchronous motor moving said strip at such rate that said indicia register with said indicator in time-phased relationship with the time of day indicated by said clock.

5. An automatic reminder comprising an elongated strip of flexible electrically non-conductive material adapted for movement from a supply roller to a receiving roller, said strip having time-designating indicia thereon arranged longitudinally thereof and having at least one perforation therein aligned with a selected indicia; a stationary indicator positioned adjacent said moving strip cooperating with said indicia for indicating the time of day during the movement of said strip; a drive mechanism normally moving said strip onto said receiving roller in timed phase relationship relatively to said indicator; reversible mechanism adapted for selectively alternately driving said strip-receiving roller or said strip-supply roller for respectively moving said strip forwardly or rearwardly with increased speed relatively to its normal time-synchronized speed; an electric circuit including a synchronous electric motor for driving said strip-moving drive mechanism, a reversible electric motor for driving said reversible mechanism, a solenoid-operable clutch for operatively connecting said reversible mechanism with said strip-receiving roller, a solenoid operable clutch for operatively connecting said reversible mechanism with said strip-supply roller, a throw-out solenoid for operatively disconnecting said synchronous motor from said strip drive mechanism, a double throw switch for energizing said throw-out solenoid to operatively disengage said synchronous motor from said strip driving mechanism and simultaneously energize said reversible motor and selectively energize either of said clutch-operating solenoids for selectively moving said strip with increased speed in a selected forward or rearward direction, an electrically operable warning signal, and a pair of contacts in said circuit normally maintained in spaced apart open circuit position by said strip moving therebetween, said contacts being adapted to close said circuit to cause operation of said warning signal when said strip had advanced to present said perforation between said contacts to permit one of said contacts to pass therethrough into engagement with the other of said contacts to close the circuit to thereby actuate said warning signal.

6. In a signal system, an electric circuit including a synchronous electric clock in said circuit, a normally deenergized visual signal, a normally deenergized audible signal, a normally open switch adapted for simultaneously energizing said signals and having a pair of contacts, a movable strip of electrically non-conductive material passing between said contacts thereby maintaining said switch in open position and both of said signals deenergized and having at least one perforation therein, a stationary indicator mounted adjacent said strip, means including a synchronous motor for moving said strip, said strip having time-indicating indicia arranged longitudinally of and along a marginal portion thereof, said indicia designating the time in year, month, day of month and hour and minute of the day in association with said indicator, said strip having portions adjacent said indicia adapted to receve thereon memoranda intellectually associated with the signal-actuating perforation aligned with selected time-indicating indicia, both of said signals being simultaneously energized when a perforated portion of said strip is brought into alignment with said contacts and said contacts engage one with the other to close the circuit through said switch, a relay in said circuit for maintaining both of said signals energized after initial energization through the closing of said circuit through said switch contacts, a normally closed second switch in said circuit adapted to be opened to deenergize said audible signal, and a third normally closed switch in said circuit adapted to be opened to simultaneously deenergize said relay and both of said signals or if said audible signal is deenergized then to simultaneously deenergize said relay and said visual signal.

7. In a signal system, an electric circuit, a signal in said circuit, a switch in said circuit having opposed contacts, an elongated strip of electrically non-conductive material having at least one perforation therein, means for moving said strip between said opposed contacts to thereby maintain said switch in open position and said signal inoperative, said signal being operative when a perforated portion of said strip is moved into alignment with said switch contacts to thereby permit said contacts to engage each other to close the circuit, a manually operable normally closed switch in said circuit, and a relay in said circuit whereby said signal is rendered continuously operative after said circuit is initially closed through said opposed switch contacts and after said perforated portion of said strip has moved out of alignment with said opposed contacts, said signal being rendered inoperative when said manually operable switch is opened.

8. In a signal system, the combination with an electric circuit including a signal, a switch for said signal having opposed contacts, a synchronous electric motor operated clock for indicating the time of day, and a synchronous electric drive motor, of a movable elongated strip of electrically non-conductive material having thereon time-designating indicia arranged longitudinally thereof, a stationary indicator positioned to register with said indicia to designate the time of day, said strip having a plurality of perforations spaced longitudinally thereof at predetermined locations in registrations with selected time-designating indicia, said strip being mounted for movement between said opposed contacts by said drive motor at such rate that said indicia register with said indicator in time-phased relationship with the time of day indicated by said clock and whereby the unperforated portion of said strip maintains said switch open and said signal deenergized, said switch being operative to close the circuit and energize said signal when a perforated portion of said strip is aligned with said opposed contacts to permit said contacts to engage each other to close the circuit, a relay adapted to be simultaneously energized with said signal and to maintain said signal operative, and a manually operable second switch operative to open the circuit to said relay and said signal to deenergize said relay and signal.

9. An automatic reminder and signal system comprising a desk plate, a supply roller having wound thereon an elongated strip of paper, a roller for receiving said strip in wound form thereon from said supply roller, said strip being movable between said rollers over said desk plate, said strip having time-indicating indicia on a marginal portion arranged longitudinally of the strip, a circuit including a source of electric energy, an electric signal in said circuit, a synchronous electric clock in said circuit, a signal-control switch in said circuit having a pair of contacts, an indicator positioned adjacent said indicia, synchronous-motor-driven means for moving said strip over said desk plate at such rate that said indicia move into successive registration with said indicator in synchronized time phase relationship with the time of day indicated by said indicia at said indicator and by said electric clock, said strip being arranged to move between said contacts to thereby maintain said contacts separated with said circuit open therethrough and said signal inoperative, said strip having longitudinally spaced perforations at points in alignment with selected time-indicating indicia for future actuations of said signal, said contacts being adapted to engage each other through said perforations to close the circuit when said perforations pass into alignment with said contacts at the times indicated by such perforation-aligned indicia, said strip having portions thereof adjacent said indicia adapted to receive memoranda thereon which are intellectually associated with selected times of day designated by the perforation-aligned time-indicating indicia, and including an additional pair of said signal-control switches in said circuit operatively connected with a second switch having an electromagnetically actuated armature for alternately closing and opening the circuit through said second switch to thereby render said electric signal respectively operative and inoperative, said strip having cooperative pairs of perforations, the perforations of each pair being arranged in selected relatively spaced locations longitudinally and transversely of the strip whereby one of said perforations of each of said pairs is adapted to cause a closing of the circuit through one of said control switches at a predetermined time to thereby actuate said electromagnetically actuated second switch to energize said electric signal and whereby the other of said perforations of each of said pairs is adapted to cause an opening of the circuit through the other one of said control switches at a predetermined time to thereby actuate said electromagnetically actuated second switch to deenergize said electric signal, the duration of operation of said electric signal being predetermined by the alignment of the two perforations of each pair with the marginal time-indicating indicia on the strip.

10. An automatic reminder and signal system as set forth in claim 9, and including reversible motor and a separate switch therefor in said circuit, mechanism operatively connected with said reversible motor for moving said strip in relatively reverse directions, independently of said synchronous-motor-driven means for moving said strip in said synchronized time-phased relationship, to permit advanced movement of the strip for perforation thereof for signal actuation at a future time and for permitting, after such advance perforation of the strip, the reverse movement of the strip into normal time-synchronized movement by said synchronous-motor-driven means, and including solenoid operated means in said circuit controlled by said separate switch adapted to operatively disconnect the movement of said strip by said synchronous-motor-driven means simultaneously with the closing of the circuit through said separate switch to cause an energization of said reversible motor to thereby move said strip in either of said relatively reverse directions.

HERMAN J. FOWLER.

REFERENCES CITED

The following references are of record in the file of this patent:

UNITED STATES PATENTS

| Number | Name | Date |
|---|---|---|
| 1,137,427 | Schaff | Apr. 27, 1915 |
| 1,142,604 | Moore | June 8, 1915 |
| 1,172,080 | Voigt | Feb. 15, 1916 |
| 2,080,330 | Ottoway | May 11, 1937 |